United States Patent [19]

Cupp et al.

[11] Patent Number: 5,169,202
[45] Date of Patent: Dec. 8, 1992

[54] MULTIPLE-USE WORKBENCH FOR USE AS A TAILGATE ON A TRUCK

[76] Inventors: John Cupp, 3120 Dalton Ct., Bensalem, Pa. 19020; William D. Turner, 46 N. Spring Rd., Phoenixville, Pa. 19460; John Donnelly, 1382 Butternut Dr., Southampton, Pa. 18966

[21] Appl. No.: 813,817
[22] Filed: Dec. 26, 1991
[51] Int. Cl.⁵ ............................................. B62D 25/00
[52] U.S. Cl. ................................. 296/51; 296/57.1; 296/61; 269/900
[58] Field of Search ..................... 296/50, 51, 57.1, 61

[56] References Cited

U.S. PATENT DOCUMENTS

| | | | |
|---|---|---|---|
| 3,131,962 | 10/1961 | St. Clair | 296/3 |
| 3,148,912 | 7/1964 | Curtis et al. | 296/50 |
| 3,548,540 | 12/1970 | Cullings | 49/163 |
| 3,600,032 | 11/1971 | Gross | 296/13 |
| 3,726,422 | 4/1975 | Zelin | 296/26 |
| 3,844,158 | 10/1974 | Mercer | 296/24.1 |
| 4,136,905 | 1/1979 | Morgan | 296/50 |
| 4,141,582 | 2/1979 | Streeter | 296/57 |
| 4,165,118 | 8/1979 | Jensen | 296/50 |
| 4,191,388 | 4/1980 | Barksdale | 280/166 |
| 4,200,328 | 4/1980 | Morgan | 296/50 |
| 4,201,411 | 5/1980 | Morgan | 296/50 |
| 4,353,589 | 10/1982 | Hartberg | 296/50 |
| 4,375,306 | 3/1983 | Linder | 296/26 X |
| 4,639,032 | 1/1987 | Barbour | 296/62 |
| 4,705,315 | 11/1987 | Cherry | 296/37.1 |
| 4,743,058 | 5/1988 | Fedrigo | 296/180.1 |
| 4,750,777 | 6/1988 | Brammer | 296/50 |
| 4,757,876 | 7/1988 | Peacock | 182/95 |
| 4,763,944 | 8/1988 | Fry et al. | 296/50 |
| 4,789,195 | 12/1988 | Fletcher | 296/37.6 |
| 4,884,838 | 12/1989 | Slater | 296/180.1 |
| 4,887,526 | 12/1989 | Blatt | 108/44 |
| 4,902,066 | 2/1990 | Norman | 296/57.1 |
| 4,915,437 | 4/1990 | Cherry | 296/37.6 |
| 4,930,834 | 6/1990 | Moore | 296/50 |
| 4,993,088 | 2/1991 | Chudik | 296/26 X |

Primary Examiner—Robert R. Song
Attorney, Agent, or Firm—Ferrill, Logan, Johns & Blasko

[57] ABSTRACT

An improved fold-down tailgate for use on a truck-like vehicle is disclosed. The tailgate of the present invention employs a slotted work surface which permits the ready attachment of various construction implements, such as cargo ramps, extended work surfaces, and a wide variety of vises, clamps and tie-down devices. The tailgate provides improved functionality while maximizing the amount of cargo space in the vehicle.

14 Claims, 8 Drawing Sheets

MULTIPLE-USE WORKBENCH FOR USE AS A TAILGATE ON A TRUCK

BACKGROUND OF THE INVENTION

1. Field of the Invention

The present invention relates to apparatus attached to a vehicle to serve as a work area. More particularly, the present invention relates to a fold down tailgate for use on truck-like vehicles which may serve as a workbench and other useful functions.

2. Background of the Prior Art

It is a common need today in construction trades to provide a stable and reliable work area at an outdoor construction site. Although portable workbenches are regularly employed, these units usually either are bulky and hard to transport and set up, or are compact but of limited size and strength for large construction projects.

Although pickup trucks, station wagons, utility vehicles and other truck-like vehicles regularly have fold-down rear tailgates which may serve as a rudimentary work surface, normal tailgates are not designed and constructed for such use. Conventional tailgates generally do not provide a flat work surface or ready means to permit attachment of tools, clamps or other implements which may be employed at a job site. Additionally, conventional fold-down tailgates normally have minimal bracing to maintain a level work surface—necessarily limiting the weight of material which can be supported thereon.

Perhaps in recognition of these problems, a number of possible solutions have been proposed to provide a reliable work area in conjunction with a vehicle. U.S. Pat. No. 4,375,306, issued to Linder Mar. 1, 1983, and U.S. Pat. No. 4,993,088, issued to Chudik Feb. 19, 1991, each disclose fold out work area for attachment to a truck bed. More modest table devices are shown in U.S. Pat. No. 3,726,422, issued to Zelin Apr. 10, 1975, and U.S. Pat. No. 4,887,526, issued to Blatt Dec. 19, 1989.

Similarly, various equipment storage devices are shown in U.S. Pat. No. 3,844,158, issued to Mercer Oct. 29, 1974, U.S. Pat. No. 4,705,315, issued to Cherry Nov. 10, 1988, U.S. Pat. No. 4,789,195, issued to Fletcher Dec. 6, 1988, and U.S. Pat. No. 4,915,437, issued to Cherry Apr. 10, 1990. Finally, a number of solutions have been suggested for providing ramps to ease the loading of equipment into a truck, such as U.S. Pat. No. 4,141,582, issued to Streeter Feb. 27, 1979, and U.S. Pat. No. 4,884,838, issued to Slater Dec. 5, 1989.

Although the above devices may function adequately for their stated purposes, it is believed that none is a fully satisfactory solution for the need of providing a simple and heavy duty remote work area. Additionally, each of these devices appears to have limited utility, requiring multiple units to provide most common utility functions (e.g. cargo ramps, work table, secure surface for fastening and operating electric equipment, etc.). Moreover, none of these devices provide a work area without consuming cargo space and adding needless weight and complexity to the vehicle.

Accordingly, it is a primary object of the present invention to provide a easily transportable workbench for use on truck-like vehicles which adds minimal weight to the vehicles and consumes little or no vehicle cargo space.

It is a further object of the present invention to provide such a workbench which is heavy duty and will readily and reliably support a number of projects regardless of weight or severe operational demands.

It is an additional object of the present invention to provide a workbench which may be easily modified for a variety of other purposes, such as serving as cargo ramps, providing extended work areas, and providing ready tie-downs for equipment and material.

These and other objects of the present invention will become evident from review of the following specification.

SUMMARY OF THE INVENTION

The present invention provides a replacement fold down tailgate for use on most truck-like vehicles. The tailgate of the present invention provides a work surface comprising alternating gaps and multiple strips of material. A wide variety of implements may be easily attached to the work surface by merely passing various locking means through one or more gaps and securing the implement to both the top and bottom of the work surface.

Among the implements disclosed in the present invention are legs to create a strong and stable work area, cargo ramps for providing ease in loading and unloading the truck, legs for attachment to the cargo ramps to create extended work area, and a wide variety of vises and attachment means for improved functionality.

The present invention provides an extremely heavy duty work surface with tremendous utility. The tailgate of the present invention creates an ideal and expandable work surface and a ready means to attach material and equipment to a truck for transportation. Despite the vastly improved utility of the present invention, in its basic form it fits completely within the space now consumed by a conventional truck tailgate. Moreover, by employing one or more of the various tie-down improvements disclosed herein, the present invention may be used to increase the usable cargo space of a vehicle.

DESCRIPTION OF THE DRAWINGS

The operation of the present invention should become apparent from the following description when considered in conjunction with the accompanying drawings, in which.

DETAILED DESCRIPTION OF THE INVENTION

The present invention is a multi-use workbench in the form of truck tailgate. The term "truck" used throughout this description is intended to encompass any form of vehicle which has or may be adapted to have a fold-down rear tailgate, including, without limitation, pickup trucks, utility vehicles, station wagons, tractor trailers, trailers, etc.

Figure 1:
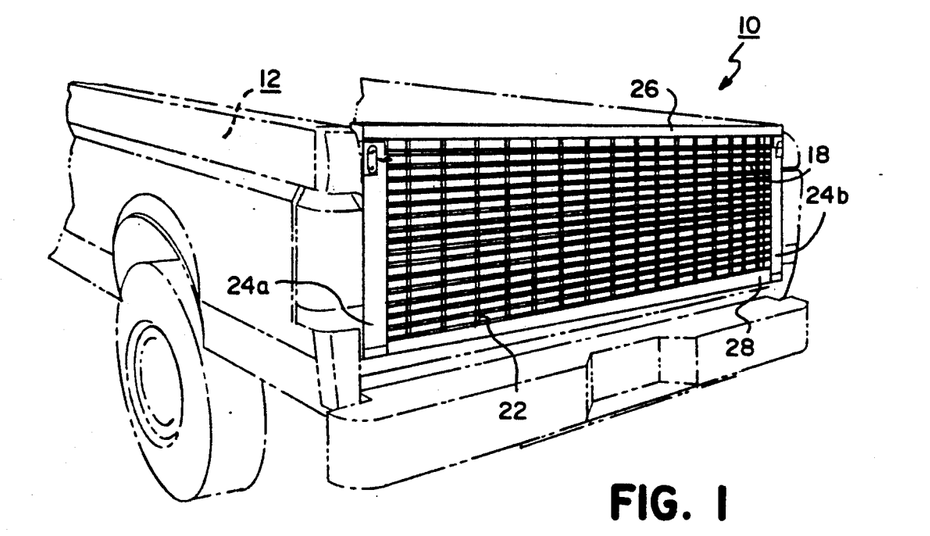
FIG. 1 is a three-quarter perspective view of the rear of a truck having the tailgate of the present invention attached thereto in a closed position.
Figure 2:
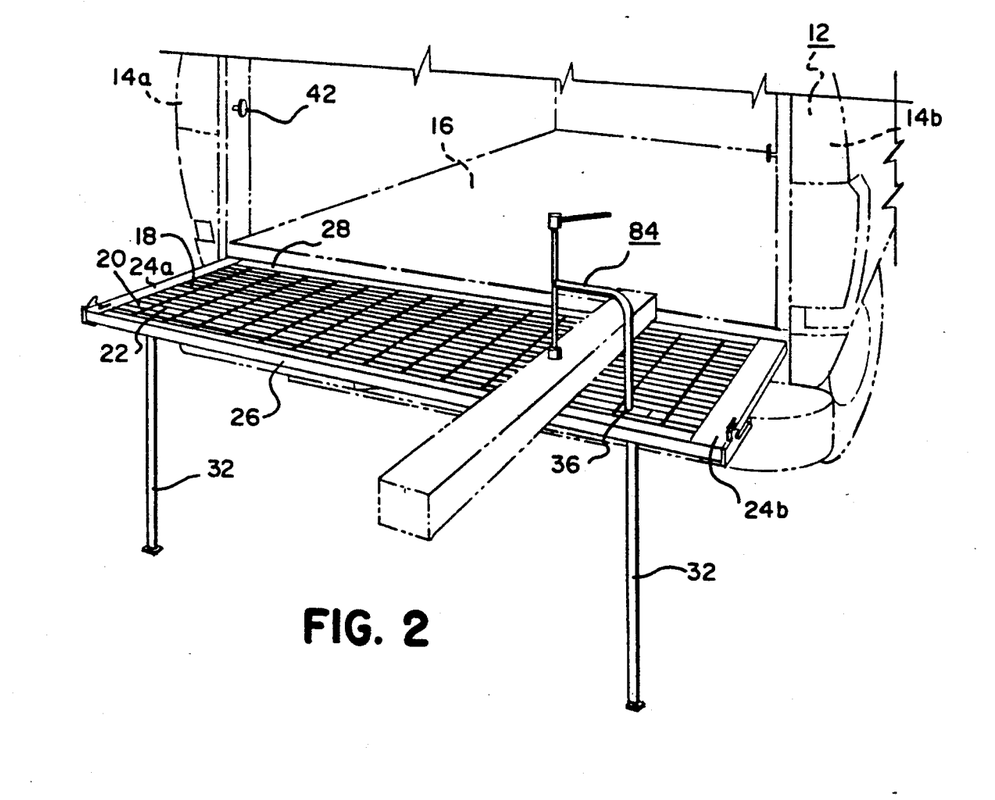
FIG. 2 is a perspective view of the tailgate of the present invention shown in an open position to serve as a workbench.

Shown in FIGS. 1 and 2 is the workbench/tailgate 10 of the present invention. The workbench 10 is attached to a vehicle 12 in place of a conventional tailgate. As is known, a conventional tailgate is attached to a truck with one or more hinge devices to permit the tailgate to pivot between a closed position (as shown in FIG. 1) and an open position (as shown in FIG. 2). A strap or chain (not shown) is normally installed between the tailgate and one or both side walls 14a, 14b of the truck 12 to hold the tailgate in a relatively horizontal open position. In an upright or closed position, the tailgate serves to help retain material or equipment on a truck bed 16. However, a conventional tailgate is not normally adapted to support heavy loads in its open position, has no ready means to secure equipment or material to it, and is often not constructed to form a flat work surface.

The workbench/tailgate 10 of the present invention provides all these benefits. As is illustrated, the workbench 10 of the present invention comprises multiple strips of material 18, aligned generally perpendicular to a planar work surface 20, and multiple dowels 22, which dowels are oriented within and perpendicular to the strips of material 18 to provide structural integrity to the workbench 10. Additional strength may be added by providing a side frame 24a, 24b, a top frame 26, and/or a bottom frame 28.

Figure 3:
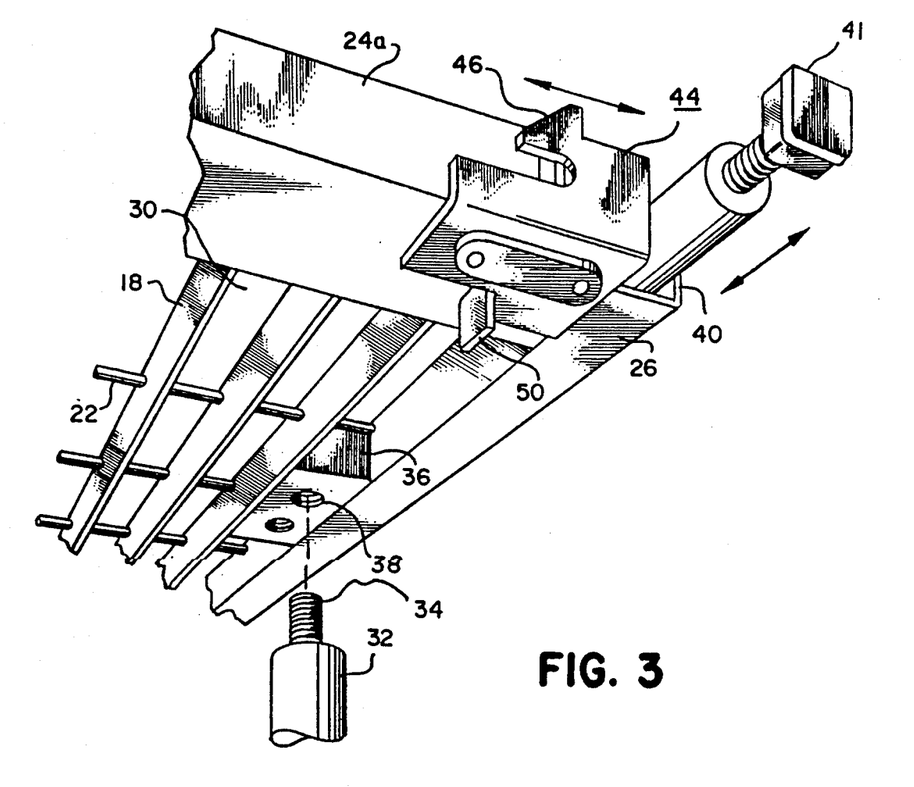
FIG. 3 is a perspective view of the underneath of the tailgate of the present invention in an open position, showing one means of attachment of support legs, one means of storage of such support legs, and one means of locking the tailgate in a closed position.

A detailed view of the preferred construction of the present invention is shown in FIG. 3. In the preferred construction, the strips of material 18 comprise flat slats, each arranged parallel to each other, a gap 30 between each slat, and evenly spaced dowels 22. Although the dowels 22 may take any shape, greatest utility is believed possible with the rounded dowels illustrated. The slats and dowels may be constructed from any suitable material, including metal or high impact plastic. For strength and durability, stainless steel is preferred.

Although the workbench 10 of the present invention may be supported in a horizontal position using cables, chains, or similar devices attached between the truck side walls 14 and the workbench 10, the addition of one or more legs 32 to support the workbench is preferred. The use of legs is considered crucial for heavy loads and/or for applications where considerable vibrations may be encountered (e.g. operating cutting or boring machinery). Where legs are employed, it is preferred to disconnect or remove support cables to increase usable work area.

The legs 32 may take any form which may be removed or retracted when the workbench 10 is in a closed position and easily attached or extended when needed. In the embodiment illustrated in FIGS. 2 and 3, the legs 32 are provided with a threaded end 34 and the workbench 10 is provided with one or more blocks 36 adapted to receive end 34 into a complementary threaded opening 38. With this arrangement, legs 34 may be quickly screwed into an operational position. For ease in storage, the top frame 26 of the workbench 10 is provided with a hollow section 40 at each end. When not in use, a leg 32 may then be conveniently stored in each end of the top frame, requiring no extra storage space in the truck and with no risk of loss. For ease in adjusting the level of the present invention, the legs 32 may be provided with retractable feet 41.

As is known, many truck designs employ a T-shaped stud 42 on each side wall 14a, 14b to which the tailgate attaches in an up position. This locking design is regularly employed in Ford and Dodge brand pickup trucks.

Figure 4:
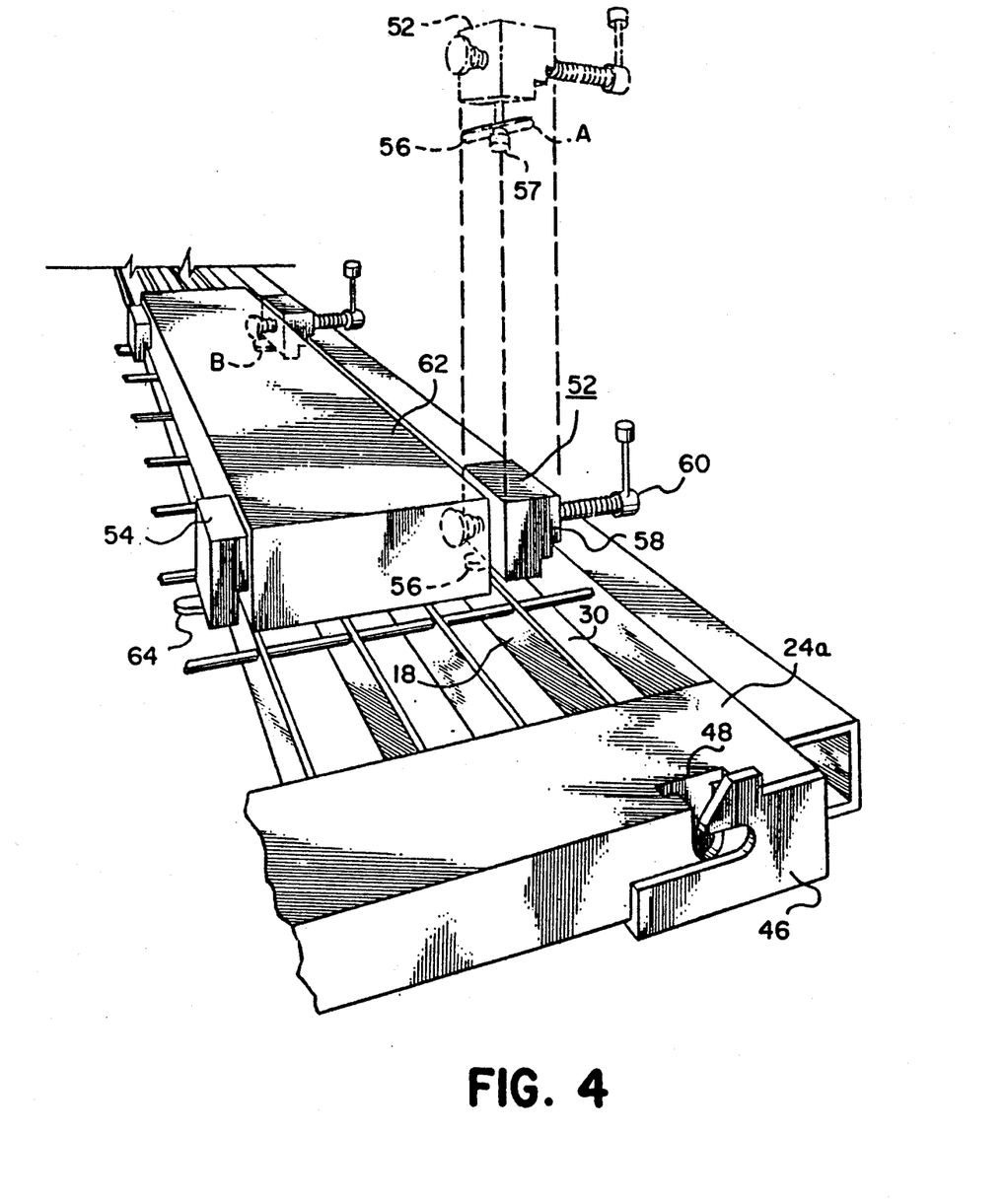
FIG. 4 is a perspective view of one form of clamp implement which may be attached to the tailgate of the present invention.

One form of locking mechanism 44 which may be used with these and some other truck designs is shown in detail in FIGS. 3 and 4. In this mechanism a sliding catch 46 is mounted on each side frame member 24a, 24b. This mechanism should be urged with an internally mounted spring or similar device to move in a downward position. A T-shaped slot 48 is provided in the side frame 24 complementing in shape and corresponding in position to the T-stud 42. A lever 50 on each slide catch 46 permits the catch to be slid up and away from the bias of the spring. A closed position of the catch 46 is shown in FIG. 3 and a partially open position is shown in FIG. 4.

In operation, the workbench unit 10 may be easily closed in an up position by merely shutting the unit 10 and allowing the locking mechanism 44 to engage and lock up the stud 42. To open the unit 10, each slide need only be lifted up to expose the T-slot 48 and permit disengagement of the stud 42. The simplicity of this arrangement permits easy, inexpensive, and highly reliable attachment of the present invention to existing truck designs.

It should be appreciated that this mechanism 44 also permits the easy securement of the present invention from theft. By supplying an opening (not shown) in the slide mechanism 46 and the side frame 24 which will receive a padlock or similar device to secure the locking mechanism in a closed position. Employing this or some other locking system, in a closed position the workbench of the present invention may be safeguarded against unintended removal. Inserting the legs within hollowed sections 40, as disclosed above, also assures that they cannot be stolen when the workbench is in a closed and locked position. For other truck designs or other applications, different locking mechanisms may be employed with the present invention without departing from the present invention.

As has been explained, the present invention provides a stable and heavy-duty work surface for use with a wide variety of projects. Although conventional clamps, screw-downs, and other conventional means to attach an implement may be employed with the present invention, the present invention readily lends itself to use with many specially designed implements of even greater utility.

Shown in FIG. 4 is a clamp 52 and block 54 combination specifically designed for use with the workbench of the present invention. The clamp 52 is provided with a T-shaped lip 56 on its lower end which is adapted to be inserted at an angle within one of the gaps 30 between the slats 18 of the workbench. Once inserted, the clamp is twisted into a position to lock the lip 56 underneath and perpendicular to the orientation of the adjacent slats 18. Alternatively, as shown, the lip 56 may pivot between a closed orientation A and an open orientation B for greater easy in attachment. For most applications, a screw adjustment 57 or similar mechanism should be provided to tighten the lip 56 up towards to the clamp body 58 for an even more secure attached position. The clamp 52 includes a threaded clamping element 60 which may be easily adjusted to secure material 62 against block 54.

The block 54 also has a T-shaped lip 64 for similar attachment under the slats 18. Again, means may also be provided on the block 54 to permit the lip 64 to be tightened against the slats 18 for a surer fit.

When used in conjunction with the clamp unit 52, this provides an extremely useful means to mount material to the workbench 10 for a variety of purposes, including for construction and transportation. The relatively small size of the clamp 52 and the block 54 make them ease to use and to store (either stored with tools, or simply left attached to the workbench 10).

Figure 5:
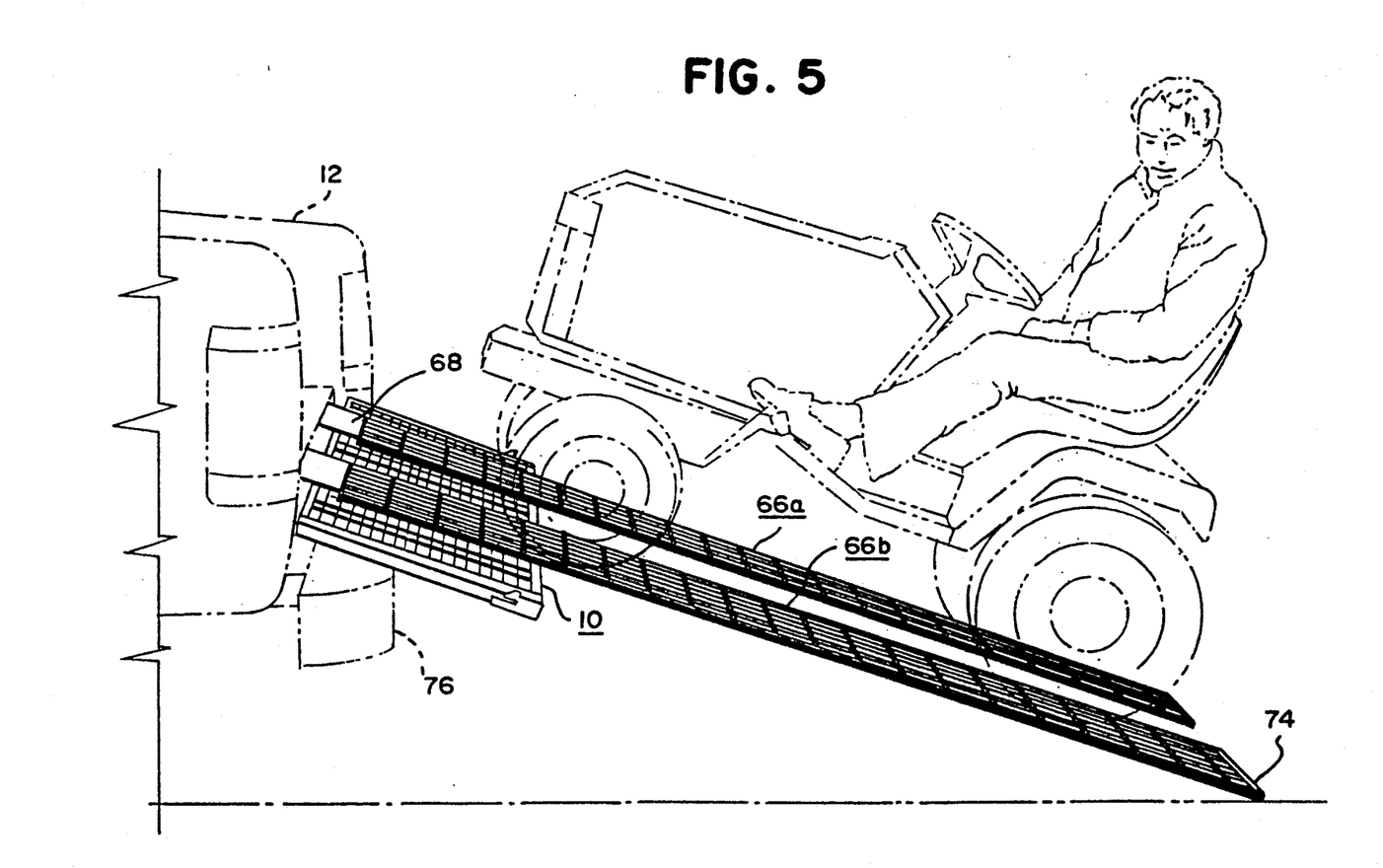
FIG. 5 is a perspective view of the tailgate of the present invention being employed with ramp implements to load equipment (in phantom) into the truck.
Figures 6, 8:
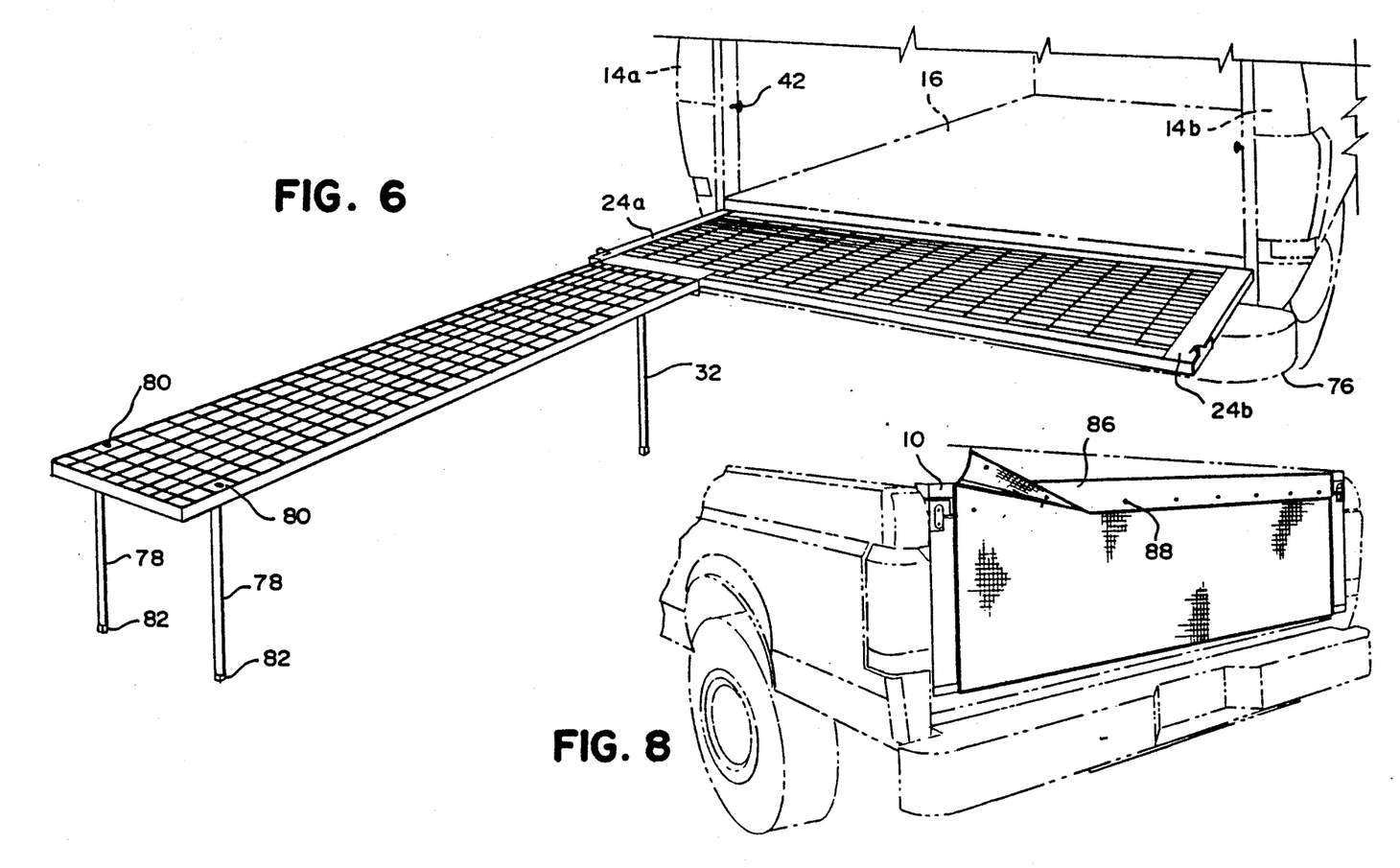
FIG. 6 is a three-quarter perspective view of a ramp implement of the present invention being employed as an additional level work area.
FIG. 8 is a three-quarter perspective view of the tailgate of the present invention shown with a material retaining cover attached thereto.
Figure 7:
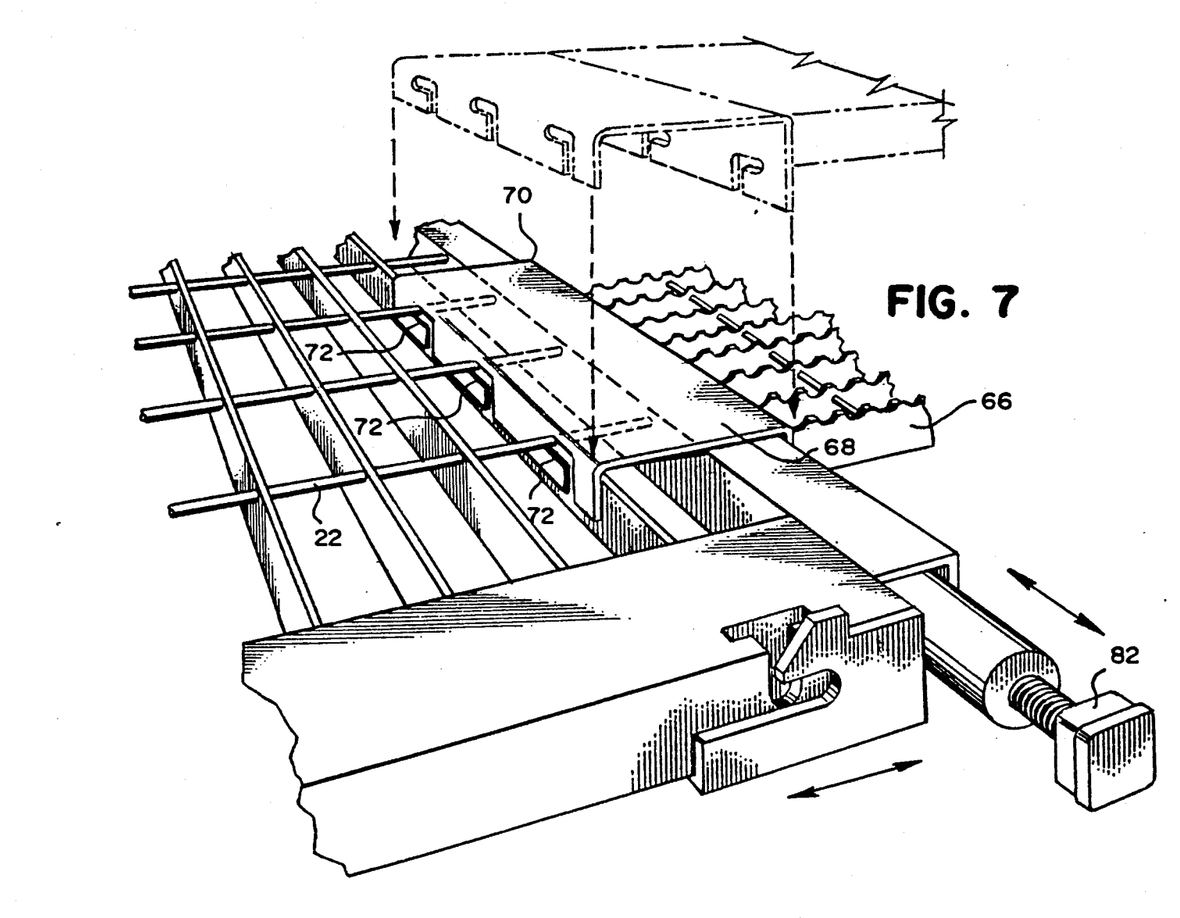
FIG. 7 is a perspective view of one form of attachment means for attaching the ramp implement of FIGS. 5 and 6.

As is shown in FIGS. 5 through 7, another extremely useful implement for use with the present invention are a set of ramps 66a, 66b. Each ramp 66 comprises a strong length of solid or corrugated material adapted to attach removably at one end to the workbench 10. Ideally, each ramp 66 is constructed in the same slat and dowel manner as the workbench 10 itself, as described above.

The preferred manner to attach the ramps 66 to the workbench 10 is shown in FIG. 7. The ramp 66 includes a bracket 68 at its first end 70 with angled slots 72 provided therein, each slot 72 corresponding to a dowel 22 on the workbench 10. As is shown, each ramp 66 is then quickly and easily attached by positioning the dowels 22 within the slots 72 and then shifting the ramp 66 into a locked position within the angled portion of the slot.

Once the ramps 66 are attached, when the workbench 10 is in a fully open position, the second end 74 of the ramp 66 rests upon the ground as is shown in FIG. 5. This provides an extremely useful means for loading heavy material and machinery into the truck 12. With an extended bumper 76 often found on trucks 12 today, the workbench 10 in its fully open position should rest upon the bumper for added strength and support. It should be appreciated that the attachment means 68 described above may be positioned at virtually any place on the workbench 10. To serve as loading ramps, it is preferred that the brackets 68 are attached high on the workbench 10 to provide a smooth transition to the truck bed 16 and to minimize the strain placed on the workbench 10.

Another useful modification for the ramps 66 is shown in FIG. 6. By providing legs 78 for the ramps, they may be supported in a horizontal position to provide an extended work area. This is very useful for larger projects or when material needs to be transferred in or out of the truck above ground level. The use of threaded blocks 80, similar to blocks 36, allows use of the same or similar legs 32 employed to support the workbench 10. With all forms of legs employed with the present invention, retractable feet 82 should be used to permit the adjustment of the workbench 10 or ramps 66 to a level position, regardless of uneven ground.

It should be evident from the above description that a host of other implements may be used with the present invention for a variety of applications. The following implements are described merely as examples of such uses.

Shown in FIG. 2 is a vertical clamp unit 84 which is helpful when a downward clamping force needs to be applied. Although the vertical clamp 84 may be attached to the workbench 10 in any conventional manner, it is preferred that it includes a threaded attachment at its lower end. When a threaded block 36 is provided with multiple openings 38, such as is shown in FIG. 3, the vertical clamp 84 may then be attached to the workbench 10 by merely screwing it into an available opening on block 36. This means of attachment is particularly preferred because it permits the vertical clamp 84 to be swiveled into an endless number of positions relative to the workbench 10.

Shown in FIG. 8 is a removable cover 86 for use with the present invention. Although there is a general trend today to provide for flow-through tailgates for trucks 12 to provide improved aerodynamics, the benefits from such designs are believed to be overstated in most instances, particularly with regard to loaded vehicles. For most applications, it is preferred to have a solid tailgate which better protects and contains the contents of the truck. To this end, it is preferred to have the workbench 10 of the present invention covered when not in use. The cover 86 shown in FIG. 8 comprises flexible material, such as vinyl or plastic, which wraps completely around the workbench 10 when not in use. Multiple snaps 88 or similar devices (e.g. hook and loop fasteners (e.g. VELCRO ®), zippers, or grommets) are provided to permit quick attachment and removal. Not only does this accessory help contain the contents of the truck, but it also protects the workbench 10 from the weather.

Figure 9:
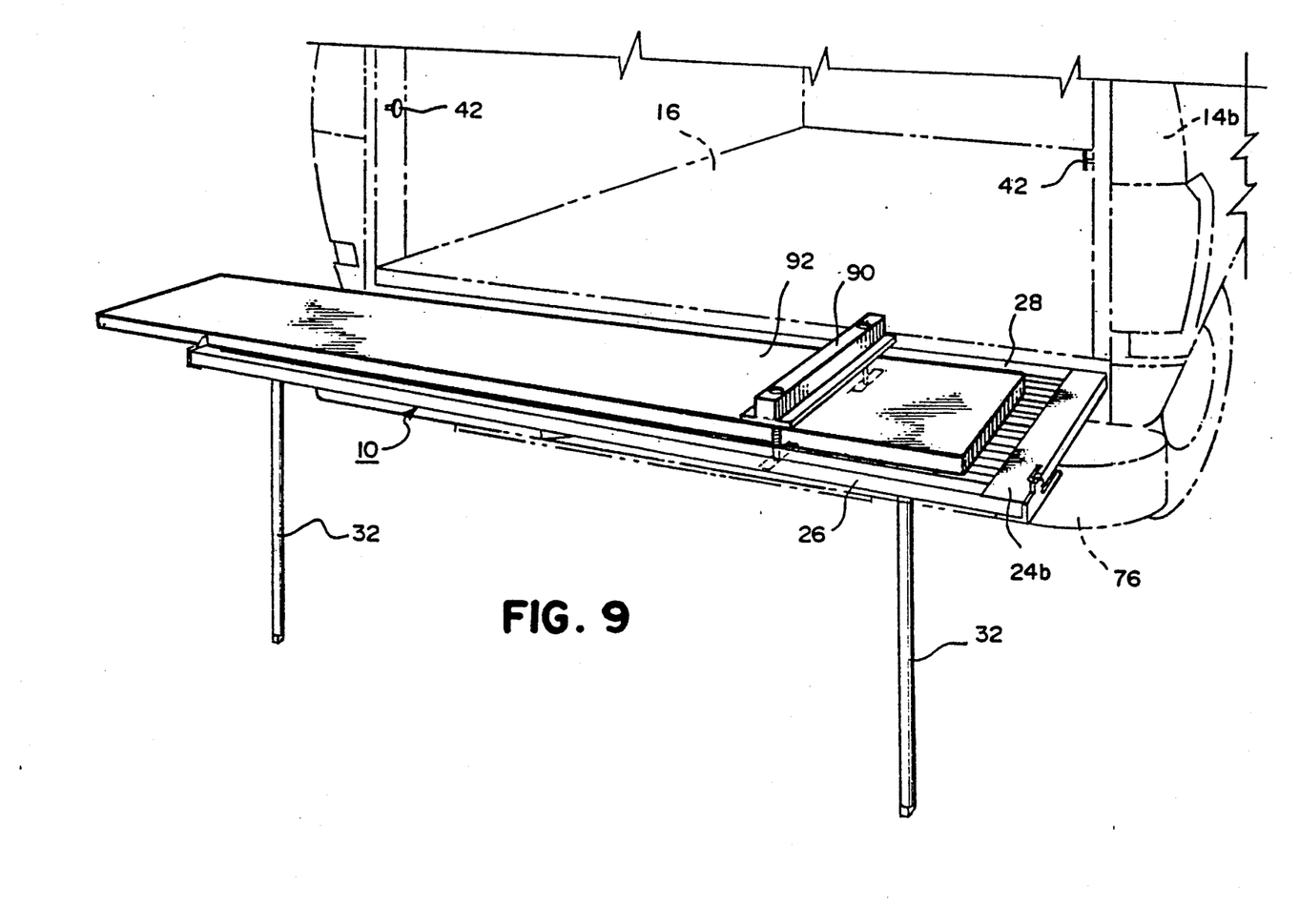
FIG. 9 is a three-quarter perspective view of a straight-edge/clamp implement which may be employed with the tailgate of the present invention.

Shown in FIG. 9 is a straightedge/clamp 90 implement which may be used with the workbench 10 of the present invention. The straightedge 90 attaches through the workbench 10 in the manner shown to clamp a board 92 or similar material to the workbench. Using a device such as this, material may be tightly attached to the truck for transportation. More importantly, by using the straightedge 90 to draw cutting lines and/or to guide a cutting instrument, this device provides a simple yet effective means to assure straight and uniform cuts.

Figure 10:
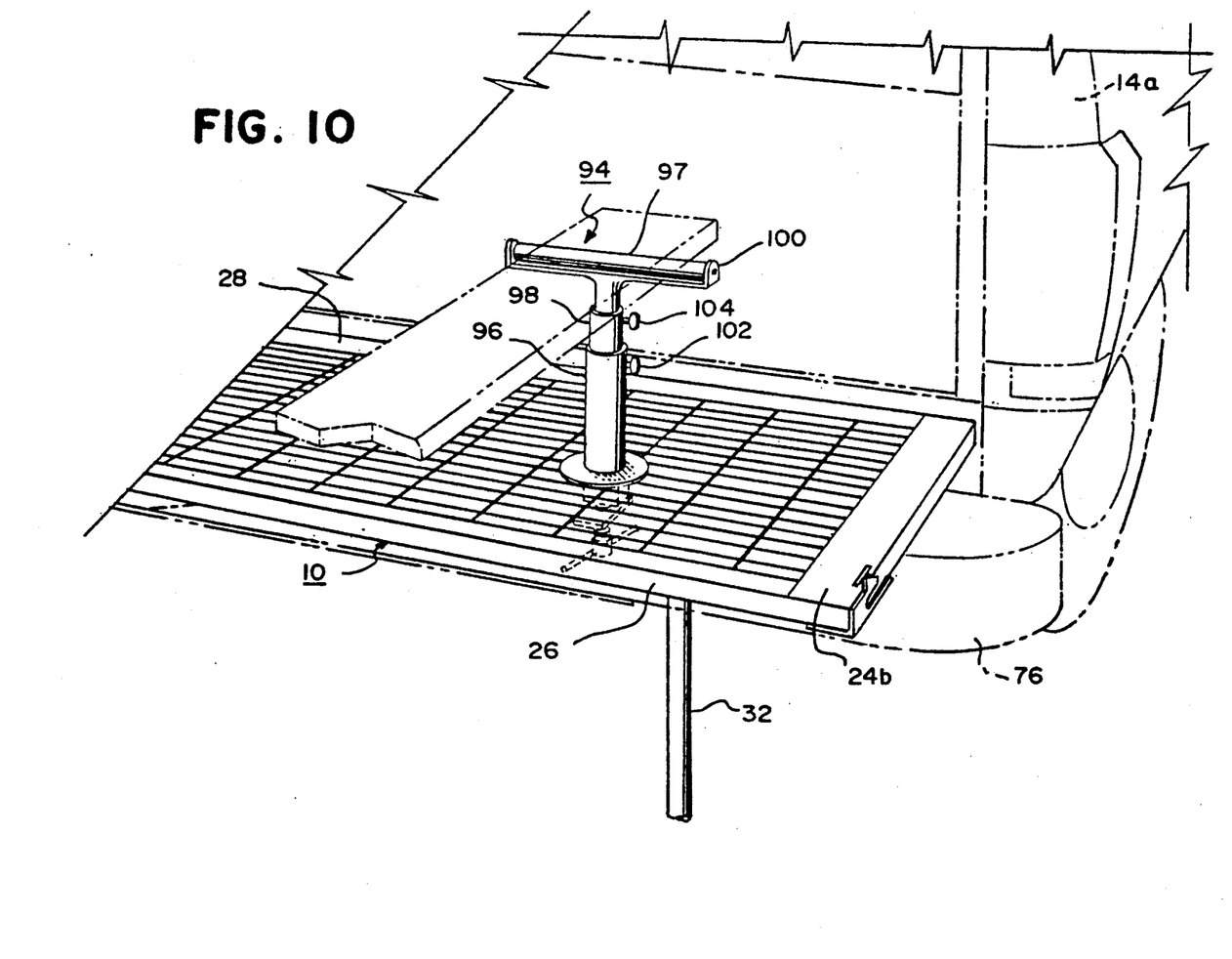
FIG. 10 is a three-quarter view of a material roller implement which may be employed with the tailgate of the present invention.

FIG. 10 shows a roller 94 implement for use with the present invention. It has been found that an adjustable roller 94 has a wide variety of uses in a construction environment—from easing loading and unloading the truck to helping to guide material which is being worked upon. The roller 94 shown attaches through a gap in the workbench 10 and has a first section 96 extending approximately 5 inches above the work surface with a roller element 97 attached thereto. The roller element should include a bearing for ease in movement, such as a conventional ball bearing and raceway design. Multiple telescoping sections 98, 100 are provided within the first section 96 to allow height adjustment. Once the precise height is reached, thumb screws 102, 104, or internal locking threads (not shown), may be used to retain that position.

Other useful implements which may be used with the present invention may include: external racks, such as ski, spare tire, wheel barrow, or bike racks, which attach to the outside of the workbench when it is in a upright position; external or internal brackets for use in securing various containers to the workbench, such as fuel or solvents containers; tie-down straps, such as elastic or "bungee" cords or leather or nylon straps, which may be used to help secure cargo for transportation or material during use at a job-site; and various job-specific applications, such as means to lock down siding measuring/cutting equipment, various power tools, pipe cutting equipment, etc.

The workbench of the present invention provides a versatile unit which greatly enhances the utility of all forms of truck vehicles. In addition to creating an ideal and expandable work surface and a ready means to attach material and equipment to a truck for transportation, the present invention also provides improved ventilation for the truck when employed with a truck cap, improved rear vision, and improved economy—both by eliminating the need to transport heavy and bulky extra work surfaces and vises to a job site, and, when used without a cover 86, through improved aerodynamics. Finally, the workbench of the present invention is very secure, allowing the workbench and many of its implements to be protected against theft, and permitting other equipment and material to be locked to a truck merely by employing locks and chains or similar devices attached to the slats in the workbench.

Although particular embodiments of the present invention are disclosed herein, it is not intended to limit the invention to such a disclosure and changes and modifications may be incorporated and embodied within the scope of the following claims.

What is claimed is:

1. A workbench apparatus for attachment as a tailgate on a truck having a truck bed, said tailgate adapted to pivot between a closed position substantially perpendicular to the truck bed and an open position at least substantially parallel to the truck bed, which workbench apparatus comprises
    a planar work surface comprising multiple strips of material aligned generally perpendicular to the work surface;
    gaps provided between strips of material to permit communication through the tailgate;
    wherein various implements may be attached to the work surface by passing attachment means through one of said gaps and securing the attachment means between both sides of the tailgate, and means for stably supporting said workbench apparatus.

2. The apparatus of claim 1 wherein at least one dowel is provided, passing through multiple strips of material, to assist in maintaining structural integrity to the tailgate.

3. The apparatus of claim 2 wherein the attachment means passes through said gap and secures around the dowel.

4. The apparatus of claim 1 wherein the strips of material comprise multiple flat slats arranged parallel to one another, with said gap uniformly provided between each slat.

5. The apparatus of claim 4 wherein multiple dowels are provided passing perpendicularly through the slats to assist in maintaining structural integrity of the tailgate.

6. The apparatus of claim 1 wherein said supporting means comprises at least one leg which is attached to the tailgate to assist in supporting and maintaining said work surface in a level position.

7. The apparatus of claim 6 wherein the leg is removable.

8. The apparatus of claim 7 wherein the tailgate is provided with a hollow section adapted to receive the leg for storage when it is not attached to the tailgate.

9. The apparatus of claim 1 wherein the tailgate is adapted to open to an angle greater than 90° relative to its closed position, and at least one ramp is provided which is adapted to attach to the tailgate in an open position and bridge between ground and the tailgate.

10. The apparatus of claim 9 wherein the ramp is adapted to receive at least one leg to support it as a level work surface.

11. The apparatus of claim 9 wherein the truck is provided with a bumper extending from the rear of the vehicle beneath the tailgate, and the tailgate in its fully open position is supported at least in part by resting upon the bumper.

12. The apparatus of claim 1 wherein one of said implements which may be attached to the work surface comprises a clamp having a clamping section attached to the work surface side of the tailgate, a retaining section attached to the opposite side of the tailgate, and means passing through the gap in the tailgate to secure the retaining section and clamping section to the tailgate.

13. The apparatus of claim 12 wherein a block implement is provide for use with the clamp to assist in retaining material on the work surface, the block implement comprising a block section attached to the work surface side of the tailgate, a retaining section attached to the opposite side of the tailgate, and means passing through the gap in the tailgate to secure the retaining section and block section to the tailgate.

14. The apparatus of claim 1 wherein a removable cover is provided to attach to the tailgate in its closed position so to assist in retaining cargo in the truck bed.

* * * * *